No. 775,687. PATENTED NOV. 22, 1904.
J. J. SNIGO.
MILK CAN LID OR COVER.
APPLICATION FILED JULY 13, 1904.
NO MODEL.

No. 775,687. Patented November 22, 1904.

UNITED STATES PATENT OFFICE.

JAMES J. SNIGO, OF PITTSBURG, PENNSYLVANIA.

MILK-CAN LID OR COVER.

SPECIFICATION forming part of Letters Patent No. 775,687, dated November 22, 1904.

Application filed July 13, 1904. Serial No. 216,424. (No model.)

*To all whom it may concern:*

Be it known that I, JAMES J. SNIGO, a citizen of the United States, residing at Pittsburg, in the county of Allegheny and State of Pennsylvania, have invented a new and useful Improvement in Milk-Can Lids or Covers, of which improvement the following is a specification.

This invention relates to a lid or cover; and it consists in the certain details of construction and combination of parts, as will be fully described hereinafter.

Figure 1:
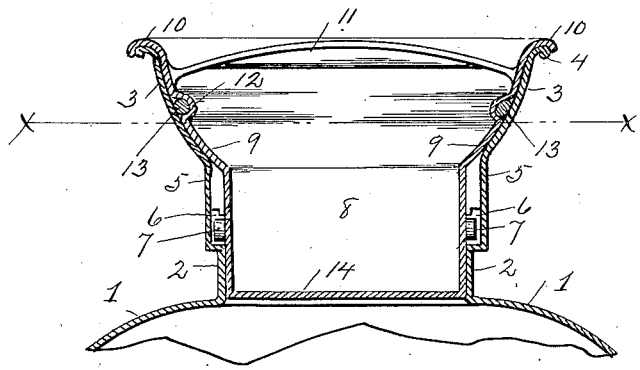
Figure 2:
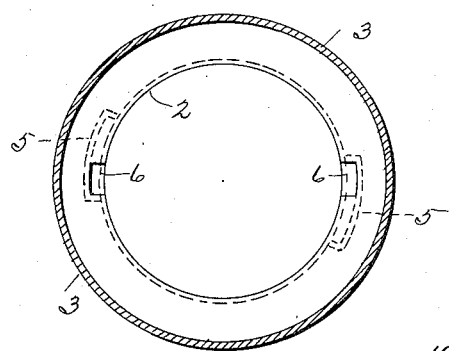
Figure 3:
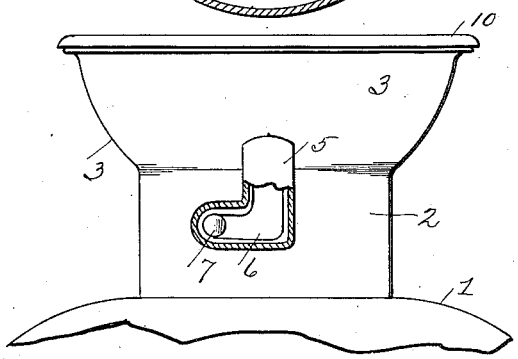

In the accompanying drawings, Figure 1 is a side sectional elevation of my improved milk-can lid or cover, the same being constructed and arranged in accordance with my invention. Fig. 2 is a sectional plan view of the same, the said section being taken on the line X X of Fig. 1. Fig. 3 is an outside elevation of the neck of a milk-can, a part of which is shown in section, the said neck being fitted with a means for locking the lid or cover thereto.

To put my invention into practice with a milk-can 1 of ordinary construction, the neck 2 of which is formed with a flaring top portion 3, I arrange at either side and diametrically opposite to each other two L-shaped slots 6, the upper ends of which extend into the flaring portion 3, and each of the said slots is provided with a cover 5 of the same form, as will be seen by reference to Fig. 3 of the drawings. The lid or cover consists of a lower section 8 cylindrical in form, the diameter of which is the same as that of the neck 2, and a flaring top portion 9, terminating in a flanged periphery 10 and provided with an inside handle 11. This lid or cover constructed as described is formed with a groove extending about the flaring portion 9, adapted to retain a soft-rubber band or gasket 13 and form a complete seal, and the lower portion 8 of the lid is fitted with two outwardly-projecting pieces 8, which register with the slots 6 and form the lock for the lid or cover.

In operation the lid or cover is forced into the neck of the can, care being taken to enter the projections 7 into the slots 6, and by a slight turn the said projections 7 are entered into the horizontal portions of the slots, as will be seen by reference to Fig. 3 of the drawings. The rubber band or gasket 13 will form an air-tight seal, and the bottom 14 will be in close contact with the body of the milk in the can, leaving little, if any, space, which will prevent churning while the milk is being transported from place to place and roughly handled.

Various slight modifications and changes may be made in the details of construction without departing from the spirit of the invention. Therefore I do not wish to confine myself to that shown and described.

Having thus described my invention, what I claim, and desire to secure by Letters Patent, is—

The herein-described lid or cover for milk-cans, consisting of the lower portion 8, having a closed bottom 14, the upper integral flaring portion 9 terminating in a flanged periphery 10, the circumferential groove 12, formed in said flaring portion, a rubber band or gasket 13 arranged in said groove, the handle 11 and the radial projections 7, in combination with a can, the neck 2 of which is formed with L-shaped slots 6, the one located opposite to the other, the upper ends of which extend into the flaring portion 3, and suitable covers 5, arranged over said slots, all arranged and combined for service, substantially as and for the purpose described.

In testimony whereof I have hereunto signed my name in the presence of two subscribing witnesses.

JAMES J. SNIGO.

In presence of—
JOHN GROETZINGER,
M. HUNTER.